United States Patent [19]

Spykerman

[11] Patent Number: 5,330,146
[45] Date of Patent: Jul. 19, 1994

[54] CONTAINER HOLDER

[75] Inventor: David J. Spykerman, Zeeland, Mich.

[73] Assignee: Prince Corporation, Holland, Mich.

[21] Appl. No.: 163,321

[22] Filed: Dec. 7, 1993

[51] Int. Cl.⁵ .............................................. A47K 1/08
[52] U.S. Cl. ........................... 248/311.2; 224/42.45 R; 224/281; 297/194
[58] Field of Search ........................ 248/311.2, 146; 297/194; 108/44, 26; 224/42.43, 42.44, 42.45 R, 281, 275

[56] References Cited

U.S. PATENT DOCUMENTS

| | | |
|---|---|---|
| 4,040,659 | 8/1977 | Arnold . |
| 4,417,764 | 11/1983 | Marcus et al. . |
| 4,733,908 | 3/1988 | Dykstra et al. . |
| 4,756,572 | 7/1988 | Dykstra et al. . |
| 4,783,037 | 11/1988 | Flowerday . |
| 4,953,771 | 9/1990 | Fischer .......................... 224/275 X |
| 4,955,571 | 9/1990 | Lorence et al. . |
| 4,981,277 | 1/1991 | Elwell .............................. 224/281 X |
| 5,024,411 | 6/1991 | Elwell .............................. 224/281 X |
| 5,060,899 | 10/1991 | Lorence et al. . |
| 5,072,989 | 12/1991 | Spykerman et al. . |
| 5,087,008 | 2/1992 | Miller et al. . |
| 5,171,061 | 12/1992 | Marcusen ........................... 297/194 |
| 5,190,259 | 3/1993 | Okazaki ........................... 297/194 X |
| 5,195,711 | 3/1993 | Miller et al. . |
| 5,228,611 | 7/1993 | Yabuya ........................... 248/311.2 X |
| 5,232,262 | 8/1993 | Tseng ............................... 297/194 |
| 5,248,183 | 9/1993 | Gignac et al. . |
| 5,253,838 | 10/1993 | Spykerman ...................... 297/194 X |
| 5,259,579 | 11/1993 | Schneider ....................... 248/311.2 X |
| 5,259,580 | 11/1993 | Anderson .................... 224/42.45 R X |

Primary Examiner—J. Franklin Foss
Attorney, Agent, or Firm—Price, Heneveld, Cooper, DeWitt & Litton

[57] ABSTRACT

A container holder assembly includes a recess forming member adapted for mounting in a vehicle, a first container support member pivotally mounted to the recess-forming member for movement in and out of the recess forming member, and a second container support member pivotally mounted to the first container support member for movement through an opening in the sidewall of the first container support member between a retracted position and an extended position. By extending the first container support member and selectively extending or retracting the second container support member, one or two container holder apertures can be selectively formed for supporting one or two containers. The second container support member automatically pivots to the retracted position when the first container support member is pivoted to the storage position in the recess forming member to facilitate closure. In one embodiment, a container holder assembly includes a base having a multi-sided post, and opposing first and second container support members pivotally mounted to the base for movement between a closed position wherein a single container holding aperture is defined, and pivotable outwardly to an extended position wherein a pair of container holder apertures. The single and the double container holder apertures are defined with arcuate surfaces on the first and second container support members in conjunction with corresponding sides of the multi-sided post.

33 Claims, 3 Drawing Sheets

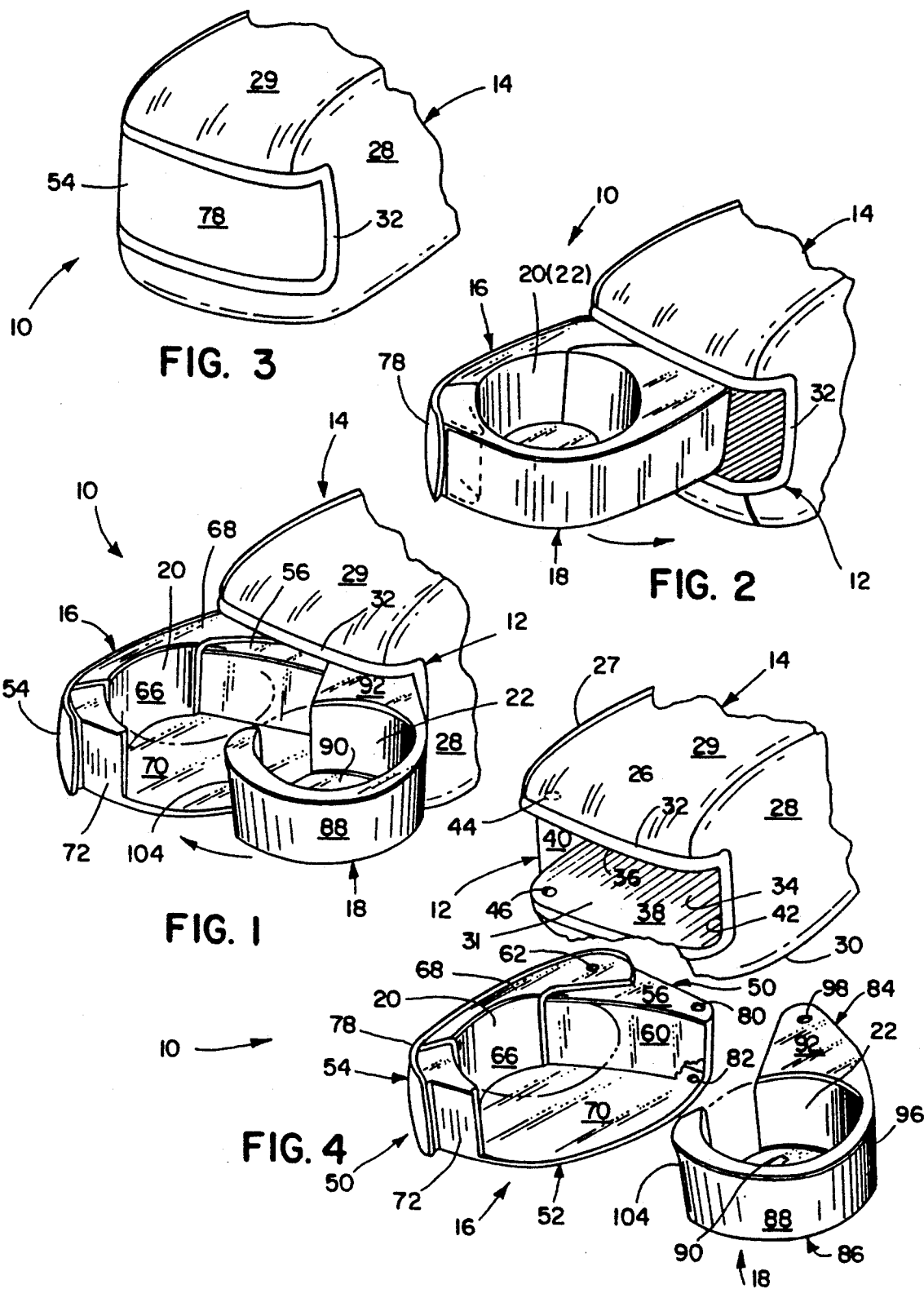

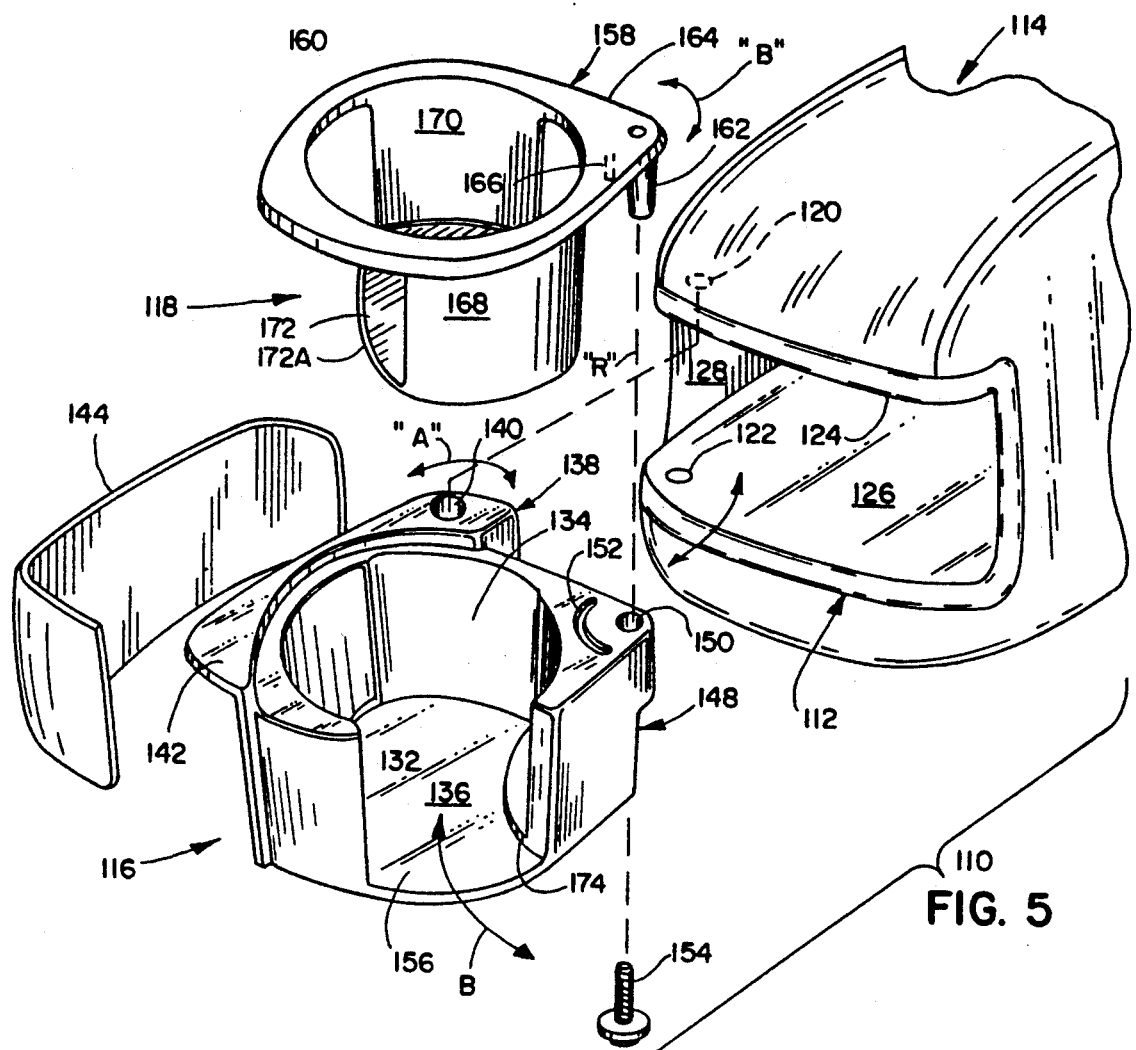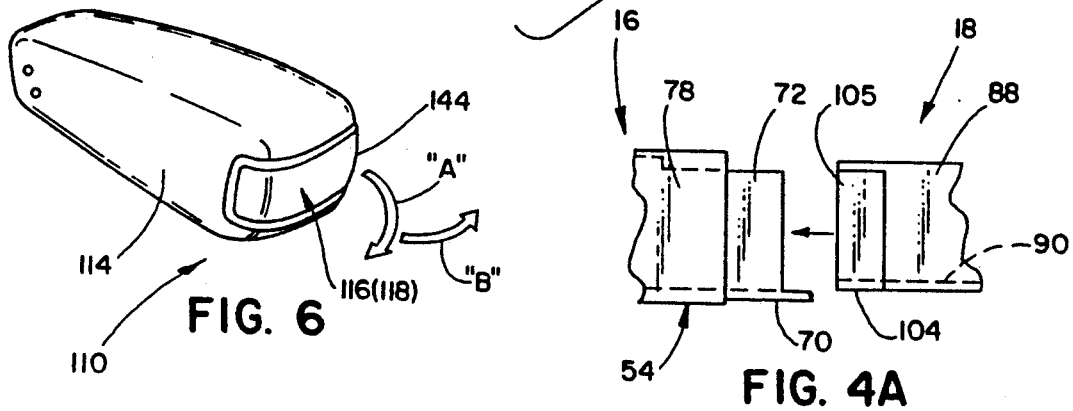

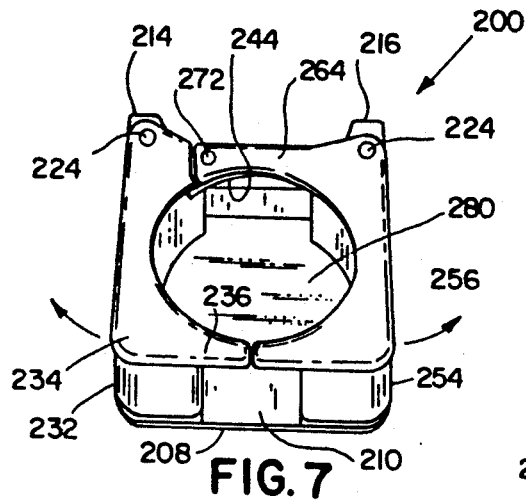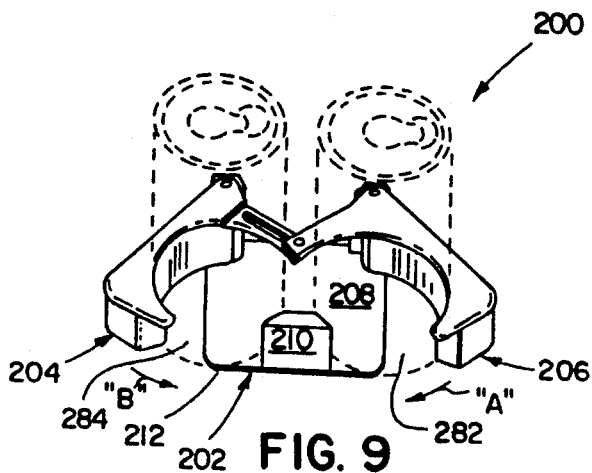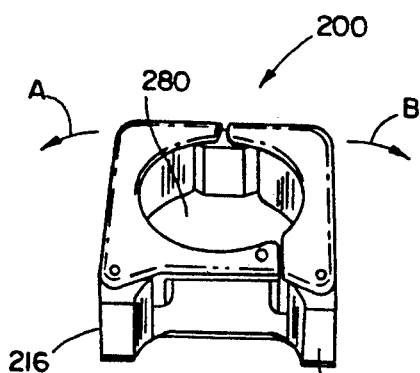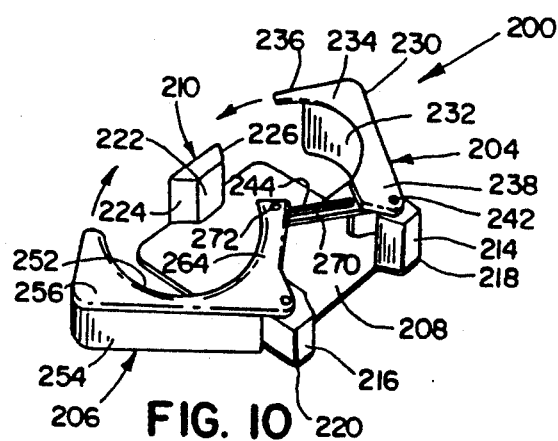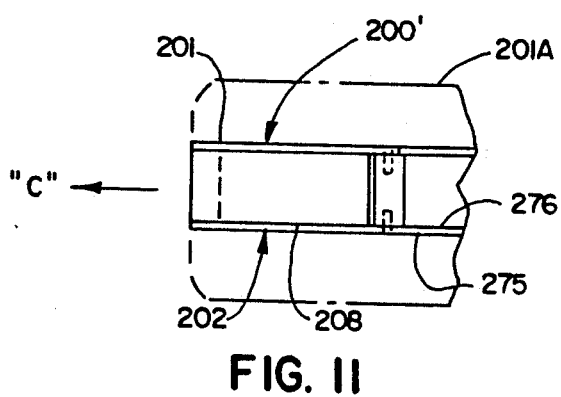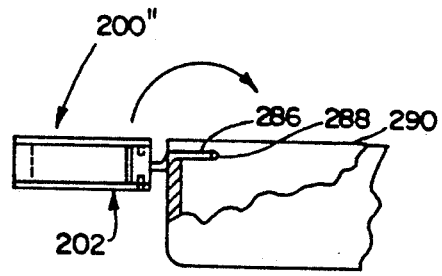

CONTAINER HOLDER

BACKGROUND OF THE INVENTION

The present invention relates to container holders for vehicles, and in particular to a container holder constructed to selectively hold one or more containers.

There exist a variety of container holders for use in vehicles, some of which are capable of supporting multiple containers. For example, U.S. Pat. Nos. 4,417,764; 4,756,572; 5,060,899; 5,072,989 and 5,195,711 each disclose armrest mounted container holders having structure adapted to support two containers or cups in a vehicle. In particular, U.S. Pat. Nos. 5,060,899 and 5,195,711 disclose container holders including a base and container support members movably connected to the base that are selectively moveable between a storage position, a first extended use position for supporting a single container, and a second extended use position for supporting a pair of containers.

However, automotive interior designers continue to demand new container holders designs having shapes and movements specifically adapted for the styling and spacial requirements of particular vehicle models. Further, the container holders must provide secure means for holding the containers in ergonomic and safe positions so that the containers will not be bumped and spilled. At the same time, it is important to maintain the simplicity and durability of the container holder, and also minimize the number of pieces and assembly costs.

Thus, container holders satisfying the above noted needs are desired.

SUMMARY OF THE INVENTION

In one aspect, the invention includes a container holder assembly having a recess forming member adapted for mounting in a vehicle. A first container support receptacle is pivotally mounted to the recess forming member for movement between a storage position in the recess forming member and a use position extended from the recess forming member. The first container support receptacle includes a C-shaped wall defining a first aperture for holding a container, the C-shaped wall including material defining an opening on one side. The container holder assembly further includes a second container support receptacle pivotally mounted to the first container support receptacle for movement through the opening between a retracted position in the first container support receptacle and an extended position. The second container support receptacle includes a second wall defining a second aperture for holding a container. The first and second apertures align for holding a single container when the second container support receptacle is in the retracted position, but define separate apertures for holding a pair of containers when the second container support receptacle is in the extended position.

In another aspect, the invention includes a container holder assembly including a base, and first and second C-shaped members pivotally mounted to the base. The first and second members are positioned in opposing relationship on the base and include first and second container support surfaces, respectively. The base includes an upright post positioned to cooperate with the first and second members to define container holder apertures. In particular, when the first and second members are moved to a retracted position relative to the post, a first aperture for holding a single container is defined. Alternatively, when the first and second members are moved to the extended position relative to the post, a pair of apertures for holding a pair of containers are defined.

The preferred embodiments of the present invention provide a container holder that can be selectively moved to provide one or two container holding apertures, but are made with few parts which are easily assembled, durable and low cost to manufacture. Further, the preferred embodiments are movable to compact arrangements for storage, and further can be moved from either single or double container holder use positions directly to the storage positions without need to first manually collapse the container holder before moving to the storage position.

These and other features, objects and advantages of the present invention will become apparent upon reading the following description thereof together with reference to the accompanying drawings.

BRIEF DESCRIPTION OF THE DRAWINGS

FIG. 1 is a fragmentary perspective view of a first container holder assembly embodying the present invention shown in the double cupholding position;

FIG. 2 is a fragmentary perspective view of the structure shown in FIG. 1 but retracted to a single container holder position;

FIG. 3 is a fragmentary perspective view of the structure shown in FIG. 1 but moved to the storage position;

FIG. 4 is an exploded fragmentary perspective view of the structure shown in FIG. 1;

FIG. 4A is a front view of the container holder assembly as shown in FIG. 1;

FIG. 5 is an exploded perspective view of a second container holder assembly embodying the present invention;

FIG. 6 is a perspective view of the structure shown in FIG. 5 in the storage position;

FIG. 7 is a front perspective view of a third container holder assembly embodying the present invention shown in a single container holding position;

FIG. 8 is a rear perspective view of the structure shown in FIG. 7;

FIG. 9 is a front perspective view of the structure shown in FIG. 7 but expanded to the double container holding position;

FIG. 10 is a perspective view from the rear and side of the structure shown in FIG. 9;

FIG. 11 is a fragmentary side view of the structure shown in FIG. 7 slideably mounted in an armrest; and FIG. 12 is a fragmentary side view of the structure shown in FIG. 7 pivotally mounted in an armrest.

DETAILED DESCRIPTION OF THE PREFERRED EMBODIMENT

A container holder assembly 10 (FIGS. 1-4) embodying the present invention includes a recess forming member or housing 12 mounted in a vehicle component, such as in the front of an armrest 14, and a pair of container support members or receptacles 16 and 18 operably mounted in recess forming member 12. Container support member 16 defines a container holder aperture 20, and is pivotally mounted to recess forming member 12 for movement between a storage position in which aperture 20 is located within recess forming member 12 (FIG. 3) and an extended position wherein container holding aperture 20 is positioned outside of recess forming member 12 in a use position (FIGS. 1 and 2). Container support member 18 defines a second container holder aperture 22. Container support member 18 is pivotally mounted to container support member 16 for selective movement between a retracted position in which container support apertures 20 and 22 are aligned for holding a single container (FIG. 2) and an extended position in which container holder apertures 20 and 22 are non-aligned for holding a pair of containers simultaneously (FIG. 1). Notably, container holder member 18 will automatically move to the retracted position within container support member 16 as container support member is moved into storage in recess forming member 12 regardless of the initial position of container holder member 18.

The illustrated armrest 14 (FIG. 4) is of the type commonly found between front vehicle seats, although it is contemplated that other vehicle components can be used as the recess forming member, such as an instrument panel or a console. Armrest 14 includes a front wall 26, sidewalls 27 and 28, a top wall 29 and a bottom wall 30. An opening 31 is formed in front wall 26 and extends partially into armrest sidewalls 27 and 28. Recess-forming member 12 defines a recess or cavity 34 for receiving container support members 16 and 18. Recess forming member 12 extends into the recess armrest 14 and includes a front lip 32 that mateably engages front wall 26 to aesthetically cover the perimeter of opening 31 in armrest 14. Recess forming member 12 includes a top wall 36, bottom wall 38 and sidewalls 40 and 42, with top wall 36 and bottom wall 38 including portions extending slightly forwardly of sidewalls 40 and 42. Pivot holes 44 and 46 are located in the forwardly extending portions of top wall 36 and bottom wall 38, respectively, proximate sidewall 40 and slightly forwardly thereof.

Container support member 16 (FIG. 4) is made of a molded plastic such as ABS, and includes a pivot forming section 50, an aperture forming section 52 defining container holder aperture 20, and a cover 54. Pivot forming section 50 includes a top wall 56, a bottom wall (not specifically shown) and a vertical wall 60 interconnecting top wall 56 with the bottom wall. Pivot holes 62 extend through top wall 56 and the bottom wall. Pivot forming section 50 has a vertical dimension about equal to the opening of recess forming member 12 such that pivot forming section 50 fits within recess forming member 12. Pivot holes 44, 46 and 62 can be aligned for receiving a pivot pin (not shown) so that container support member 16 is pivotally mounted to recess forming member 12 for movement in and out of armrest 14.

Aperture forming section 52 extends sideways from pivot forming section 50. Aperture forming section 52 includes an arcuately-shaped truncated sidewall 66, and an upper horizontal wall 68, horizontal wall 68 reinforcing and supporting arcuately-shaped wall 66. A finger-like protrusion 72 extends arcuately forwardly from aperture forming section 52. A floor 70 extends across the bottom of container support member 16 and is connected to finger-like protrusion 72 and sidewall 66 to reinforce and rigidify container support member 16. Floor 70 forms a support for containers placed in container support member 16. A C-shaped cover 78 is secured to the outside of aperture forming section 52. The outer surface of cover 78 is shaped, painted and textured to aesthetically cover recess forming member 12 when container support member 16 is moved to the closed storage position (FIG. 3). Cover 78 is configured to mateably align with trim lip 32 around the opening in recess forming member 12. Pivot forming section 50 further includes a second set of pivot holes 80 and 82 (FIG. 4) that are axially aligned with each other. Pivot holes 80 and 82 are located in top wall 56 and floor 70, respectively, in positions spaced generally sideways from pivot holes 62.

Container support member 18 (FIG. 4) is pivotally connected to container support member 16 for movement between a retracted first position in which container apertures 20 and 22 are aligned (FIG. 2), and an extended second position in which container holder apertures 20 and 22 form separate container holding apertures that are not aligned for holding a pair of containers (FIG. 1). Specifically, container support member 18 (FIG. 4) includes a pivot forming section 84 and an aperture forming section 86. Aperture forming section 86 includes an arcuately-shaped truncated sidewall 88 that extends more than 180° circumferentially, and further includes a floor 90 that rigidifies sidewall 88. Pivot forming section 84 includes a top planar wall 92 and a bottom wall (not specifically shown) interconnected and rigidified by a vertical wall 96. Planar wall 92 and the corresponding bottom wall include pivot holes 98 that are aligned. Planar wall 92 and the bottom wall are spaced apart so as to mateably engage horizontal walls 56 and 70 on container support member 16 such that pivot holes 98 can be aligned with holes 80 and 82. A pivot pin (not shown) is extended through holes 98, 80, and 82 to pivotally secure container support member 18 to container support member 16. Notably, a single pivot pin can be used or two separate pivot pins axially aligned can be used.

The end 104 of aperture forming section 86 (FIG. 4) includes an opening 105 (FIG. 4A) for receiving protrusion 72 so that when container support member 18 is pivoted to the retracted position on container support member 16, finger-like protrusion 72 of container support member 16 extends mateably into the opening 105 of end 104 of container support member 18. Also, when container support member 18 is in the open extended position, end 104 defines part of aperture 20 on container support member 16 (FIG. 1). Further, floor 90 of container support member 18 rests mateably on floor 74 of container support member 16 when in the retracted position. Notably, container support member 18 can be selectively opened for supporting two containers (FIG. 1), or can be selectively closed for supporting a single container (FIG. 2). Regardless of whether container support member 18 is in the retracted (open) or extended (closed) position, container support member 16 can be pivoted toward the storage position, in which case container support member 18 automatically moves to the more compact retracted position on container support member 16. This automatic movement occurs when the front edge of receptacle sidewall 42 engages pivot forming section 84 of container support member 18. Notably, by increasing the frictional engagement between recess forming member top and bottom 36 and 38 with container support member walls 56, 68 and 70, container support members 16 and 18 can be frictionally securely held in a selected use position. Further, detents and/or depressions and mating protrusions (not specifically shown) can be added to any of members 36, 38, 56, 68 and 70 to more securely retain the container support members 16 and 18 in the selected position.

In a second embodiment, a container holder assembly 110 (FIG. 5) includes a recess forming member or housing 112 located in an armrest 114. Container support members or receptacles 116 and 118 are pivotally connected to each other with container support member 116 also being pivotally connected to recess forming member 112. Recess forming member 112 and armrest 114 are identical to receptacle member 12 and armrest 14, respectively, and thus the discussion of recess forming member 112 and armrest 114 need not be repeated. Notably, recess forming member 112 includes pivot holes 120 and 122 located in recess forming member top wall 124 and bottom wall 126, respectively. Pivot holes 120 and 122 are located proximate and forward of recess forming member sidewall 128.

Container support member 116 includes an arcuately-shaped truncated sidewall 132 which forms container holding aperture 134. Arcuately-shaped sidewall 132 of container support member 116 defines an opening 156 in one side. A floor 136 is attached to the bottom of sidewall 132 for supporting a container or a cup in container support member 116. A pivot forming structure 138 extends rearwardly from a corner of container support member 116, pivot forming structure 138 including a pivot hole 140 which aligns with pivot holes 120 on recess forming member 112. Pivot forming structure 138 is pivotally connected to recess forming member 112 by a pivot pin (not shown) which engages holes 120, 122 and 140 for movement along path "A". A horizontally oriented web 142 extends outwardly from sidewall 132. Web 142, sidewall 132 and floor 136 form an outwardly facing shaped surface for mateably receiving a C-shaped cover 144. Cover 144 defines an outer surface identical to cover 78. In particular, cover 144 is configured to cover the opening defined by recess forming member 112 when container support members 116 and 118 are pivoted to a storage position within recess forming member 112 (FIG. 6).

A second pivot forming structure 148 is formed on arcuately-shaped sidewall 132 of container support member 116 at a position spaced from pivot forming structure 138. Pivot forming structure 148 includes a pivot hole 150 and an arcuate slot 152 positioned around pivot hole 150, the purpose of which is discussed below.

Container support member 118 includes an upper ring 158 defining a second container aperture 160. A pivot forming protrusion 162 extends downwardly from an enlarged flange 164 on ring 158, protrusion 162 being adapted to mateably slideably engage pivot hole 150 on container support member 116. A screw 154 extends upwardly through pivot hole 150 and threadably into pivot forming protrusion 162 to pivotally secure container support member 118 to container support member 116. A second protrusion 166 extends downwardly from flange 164 parallel and spaced from pivot forming protrusion 162. Second protrusion 166 mateably engages slot 152 and thus limits the rotation of container support member 118 on container support member 116 as the protrusion 166 engages the ends of slot 152. Container support member 118 includes opposing arcuately-shaped truncated sidewalls 168 and 170 that extend downwardly from ring 158, and further includes a floor 172 with arcuate edges 172A that extend arcuately between the lower ends of arcuate sidewalls 168 and 170. The side edges 172A of floor 172 define constant radii from the axis of rotation "R" defined by pivot forming protrusion 162.

There is a depression 174 in floor 136 and in sidewall 132 of container support member 116 that extends from opening 156 across container support member 116. Depression 116 forms a recess for mateably receiving container support member 116. Due to the configuration of container support member 118, container support member 118 is pivotable along path "B" through opening 156 to a storage position wherein container aperture 160 is axially aligned with container aperture 134. In the storage position, container support member 118 is located in container support member 116. Container support member 118 is further pivotable about pivot-forming protrusion 162 through opening 156 to an extended position along path B. As container support member 118 is moved, ring 158 slides on the top of arcuately-shaped sidewall 132, and container support member sidewalls 168 and 170 and floor 172 slide through opening 156 in sidewall 132. In the extended position, container support members 116 and 118 define a pair of non-aligned separate apertures so that two containers can be supported by container holder assembly 110.

A third cupholder embodying the present invention is illustrated in FIGS. 7–11 and is generally referred to by number 200. Container holder assembly 200 (FIG. 9) includes a base 202 and opposing container support members 204 and 206 pivotally mounted to base 202 for movement in opposing but corresponding paths. Base 202 includes a floor 208. A multi-surfaced post 210 is positioned centrally along the front edge 212 of base 202, and two stanchion-like blocks 214 and 216 (FIG. 10) are positioned at opposing rear corners 218 and 220 of floor 208. Multi-surfaced post 210 includes a first surface 222 that faces generally rearwardly, and opposing surfaces 224 and 226 located on either side of first surface 222 that face generally diagonally rearwardly. Container support member 204 includes a C-shaped arm 230 defining an inwardly facing arcuate surface 232. A C-shaped planar member 234 is securely attached to the top of arm 230. C-shaped planar member 234 includes a protruding end 236 that extends forwardly beyond arm 230 and a flange 238 that extends over stanchion 214. Flange 238 includes a hole that receives a pivot pin 242 for pivotally mounting C-shaped planar member 234 to base 202. A trailing arm or protrusion 244 extends laterally from C-shaped member 234 toward opposing station 216, trailing arm 244 being oriented generally perpendicularly to the body of arm 230.

Container support member 206 is a mirror image of container support member 204 except as noted below. Container support member 206 includes a C-shaped planar member 254 located on a C-shaped arm 256, which members are mirror images of the corresponding parts on container support member 204. However, C-shaped member 254 includes a trailing arm 264 different than trailing arm 244. Trailing arm 264 is positioned immediately below trailing arm 244 of C-shaped member 234 when container support members 204 and 206 are in the retracted position (FIG. 8). Trailing arm 244 (FIG. 9) includes a slot 270 and trailing arm 264 includes a pin 272 that protrudes slideably into slot 270. As container support member 116 is moved from the storage position (FIG. 7) to the open position (FIG. 9), pin 272 engages slot 270 and forces trailing arm 244 to move in a pattern corresponding to but rotationally opposite trailing arm 264. During this movement, pivot pin 272 slides along slot 270. Thus, members 204 and 206 are forced to move simultaneously along opposing arcuate paths "A" and "B" (FIG. 8).

In the closed position (FIGS. 7 and 8), first surface 222 of post 218 forms a single container holder aperture 280 with arcuate surface 232 and arcuate surface 252.

However, when container support members 204 and 206 are moved to the outwardly extended position, a second container holder aperture 282 is formed by second surface 224 and arcuate surface 232, and a third container holding aperture 284 is defined by third surface 226 and arcuate surface 252.

FIG. 11 illustrates container holder assembly 200' identical to container holder assembly 200 but slideably telescopingly mounted in a recess forming member 201 in an armrest 201A. In FIG. 11, floor 208 of base 202 has been extended rearwardly and laterally to include a member 275 that slideably engages a track/channel 276 in receptacle member 201. Thus, container holder assembly 200' is telescopingly movable into the recess defined by recess forming member 201, and is telescopingly movable outwardly in the direction of arrow "C" so that container holding apertures 280, 282 or 284 can be selectively formed.

FIG. 12 illustrates another container holder assembly 200" identical to container holder assembly 200 but pivotally mounted to a receptacle member. In container holder assembly 200", a pair of pivot forming arms 286 are extended rearwardly of base 202 for engagement with mating transverse holes 288 in recess forming member 290.

Thus, there is provided embodiments of the present invention including container holders that are selectively movable between a compact storage position, an extended use position wherein a single container holder aperture is defined, and a second extended use position wherein a pair of container holder apertures are defined. Notably, the container support members are pivotally mounted in the receptacle member so that they can be conveniently moved from the extended position to the storage position directly from either the one or two container holder aperture positions. Also notably, the container support members are constructed from a minimum of parts, thus providing long service life and maximum satisfaction to a customer. Still further, the container holders define a secure receptacle for holding a container, from which a container will not be accidentally knocked loose.

It will become apparent to those skilled in the art that various modifications to the preferred embodiments of the invention can be made without departing from the spirit or scope thereof as defined in the appended claims.

The embodiments of the invention in which an exclusive property or privilege is claimed are defined as follows:

1. A container holder assembly comprising:
a recess forming member adapted for mounting in a vehicle;
a first container support receptacle pivotally mounted in said recess forming member for movement between a storage position and a use position, said first container support receptacle including a C-shaped wall defining a first aperture for holding a container, said C-shaped wall including material defining an opening in one side; and
a second container support receptacle pivotally mounted to said first container support receptacle for movement through said opening between a retracted position in said first container support receptacle and an extended position from said first container support receptacle, said second container support receptacle including a second wall defining a second aperture for holding a container, said first and second apertures being aligned for supporting a single container when said second container support receptacle is in said retracted position, but defining separate apertures for supporting a pair of containers when said second container support receptacle is in said extended position.

2. A container holder assembly as defined in claim 1 wherein said second wall is truncated.

3. A container holder assembly as defined in claim 2 wherein said C-shaped wall includes a first end and said second wall includes a second end, said second end mateably engaging said first end when said second container support receptacle is moved to said retracted position in said first container support receptacle.

4. A container holder assembly as defined in claim 1 wherein said first container support receptacle includes a floor positioned under said first aperture, and said second container support receptacle includes a second floor positioned under said second aperture, said second floor being positioned mateably over said first floor when said second container support receptacle is in said retracted position in said first container support receptacle.

5. A container holder assembly as defined in claim 1 wherein said first container support receptacle is pivotally mounted to said recess forming member for movement about a generally vertical axis, and said second container support receptacle is pivotally mounted to said first container support receptacle for movement about a second generally vertical axis, said first and second axes being spaced from each other.

6. A container holder assembly as defined in claim 1 wherein said second container support receptacle is constructed to engage said recess forming member and automatically move to said retracted position in said first container support receptacle when said first container support receptacle is moved from said use position to said retracted storage position.

7. A container holder assembly as defined in claim 1 wherein one of said C-shaped wall and said second wall defines an arcuate shape that extends greater than 180°.

8. A container holder assembly as defined in claim 1 wherein said C-shaped wall and said second wall include first and second ends, respectively, said first and second ends being constructed to mateably engage when said second container support receptacle is pivoted to said retracted position in said first container support receptacle.

9. A container holder assembly as defined in claim 1 including a cover attached to said first container support receptacle for covering the opening of said recess forming member when said first container support receptacle is pivoted to said storage position in said recess forming member.

10. A container holder assembly as defined in claim 1 wherein said opening in said first sidewall defines a width dimension that is smaller than said second aperture defined by said second wall, but said second wall is truncated and has a profile configured to slide through said opening as said second container support receptacle is pivoted between said retracted and extended positions.

11. A container holder assembly comprising:
a base adapted for mounting in a vehicle;
a first member pivotally mounted to said base including a first container support surface;
a second member pivotally mounted to said base including a second container support surface;

said base including an upright post having an additional container support surface thereon, said first and second members being positioned in opposing relationship on said base and being movable between a retracted position whereat said first, second and additional container support surfaces define a first aperture for holding a container, and an extended position whereat said first and additional container support surfaces define a second aperture and also said second and additional container support surfaces define a third aperture for holding a pair of containers.

12. A container holder assembly as defined in claim 11 wherein said first and second members include first and second ends, respectively, that mateably engage said post when in said retracted position but are spaced from said post when in said extended position.

13. A container holder assembly as defined in claim 11 wherein said base includes means for movably mounting said base to a vehicle component.

14. A container holder assembly as defined in claim 11 wherein said first and second members are operably interconnected for simultaneous movement between said retracted and extended positions.

15. A container holder assembly as defined in claim 14 wherein said first member includes a first protruding member having a slot therein, and said second member includes a second protruding member having a pin protruding therefrom, said pin engaging said slot such that as said first member is pivoted between said retracted and extended positions said second member is forced to move simultaneously with said first member in a corresponding but opposing path.

16. A container holder assembly as defined in claim 11 wherein said additional container support surface of said post includes third, fourth and fifth container support surfaces, said third container support forming said first aperture with said first and second container support surfaces when said members are in said retracted position, said fourth container support surface forming said second aperture with said first container support surface when said members are in said extended position, and said fifth container support surface forming said third aperture with the second container support surface when said members are in said extended position.

17. A container holder assembly as defined in claim 11 wherein said post is a multi-sided post such that said additional container support surface includes a first side facing said first aperture, a second side facing said second aperture, and a third side facing said third aperture.

18. A container holder assembly comprising:
a housing defining an opening;
a first container support member pivotally mounted to said housing and configured to pivot about a generally vertical axis into said opening to a storage position and out of said opening to a use position, said container support member including a sidewall defining a container holder aperture that is accessible when said first container support member is in said use position; and
a second container support member pivotally mounted to said first container support member and configured to pivot about a generally vertical axis between a retracted position and an extended position, said first axis being spaced from said second axis, said first and second apertures being aligned when said second container support member is in said retracted position, said first and second apertures defining separate apertures for holding a pair of containers when said second container support member is in said extended position.

19. A container holder assembly as defined in claim 18 wherein said second container support member includes an arcuately-shaped wall having an outer surface, said outer surface defining a part of said first aperture when said second container support member is in said extended position.

20. A container holder assembly as defined in claim 18 wherein said first container support member sidewall includes an open side, and said second container support member is configured to slideably move through said open side as said second container support member is moved between said retracted and extended positions.

21. A container holder assembly comprising:
a housing adapted for mounting in a vehicle;
a first receptacle defining a first container holder aperture movably mounted to said housing for movement between a storage position in said housing and a use position extended from said housing, said first receptacle including a truncated C-shaped sidewall defining an opening;
a second receptacle defining a second container holder aperture movably mounted to said first receptacle for movement through said opening between a retracted position in said first receptacle and an extended position out of said first receptacle, said second receptacle including a truncated second sidewall, said first and second apertures being aligned for holding a single container when said second receptacle is in said retracted position, but being non-aligned for holding a pair of containers when said second receptacle is in said extended position.

22. A container holder assembly as defined in claim 21 wherein one of said first and second receptacles includes a floor.

23. A container holder assembly as defined in claim 21 wherein each of said receptacles includes a floor.

24. A container holder assembly as defined in claim 21 wherein said second recptacle includes a ring secured to the top of said second sidewall that further defines said second aperture.

25. A container holder assembly as defined in claim 21 wherein said second sidewall defines an end configured to mateably engage said first sidewall when in said retracted position.

26. A container holder assembly as defined in claim 25 wherein said first sidewall includes a protruding member, said end on said second sidewall being configured to mateably engage said protruding member when in said retracted position.

27. A container holder assembly as defined in claim 21 wherein said first receptacle is pivotally mounted to said housing for movement about a generally vertical axis.

28. A container holder assembly as defined in claim 21 wherein said housing defines a second opening, and said first receptacle includes a cover for closing said second opening when in said storage position.

29. A container holder assembly as defined in claim 28 wherein said housing includes a lip defining the perimeter of said second opening, said cover mateably aligning with said lip when in said storage position.

30. A container holder assembly as defined in claim 21 wherein said opening in said first receptacle defines a width dimension that is smaller than said second container holder aperture, but said second receptacle has a profile configured to slide through said opening as said second receptacle is pivoted between said retracted and extended positions.

31. A container holder assembly comprising:
 a first container support member;
 a second container support member configured to mateably engage said first container support member;
 means for pivotally mounting said support members to mateably engage each other and provide a support for a single container, said support members being pivotable away from each other to provide supports for two containers, at least one of said support members being C-shaped.

32. A container holder as defined in claim 31 wherein said C-shaped one support member extends arcuately greater than 180°.

33. A container holder as defined in claim 32 wherein both of said support members are C-shaped.

* * * * *

UNITED STATES PATENT AND TRADEMARK OFFICE
CERTIFICATE OF CORRECTION

PATENT NO. : 5,330,146
DATED : July 19, 1994
INVENTOR(S) : David J. Spykerman

It is certified that error appears in the above-indentified patent and that said Letters Patent is hereby corrected as shown below:

Column 10, line 43;
    "recptacle" should be --receptacle--.

Signed and Sealed this

Fifteenth Day of November, 1994

Attest:

BRUCE LEHMAN

*Attesting Officer*          *Commissioner of Patents and Trademarks*